US006539653B1

(12) United States Patent
Finke

(10) Patent No.: US 6,539,653 B1
(45) Date of Patent: Apr. 1, 2003

(54) DEVICE FOR DISPLAYING INFORMATION OR ADVERTISING

(76) Inventor: Rolf Finke, Ploetz 128, A-5323, Ebenau (AT)

( * ) Notice: Subject to any disclaimer, the term of this patent is extended or adjusted under 35 U.S.C. 154(b) by 0 days.

(21) Appl. No.: 09/744,053

(22) PCT Filed: Jul. 22, 1999

(86) PCT No.: PCT/AT99/00184

§ 371 (c)(1),
(2), (4) Date: Jan. 17, 2001

(87) PCT Pub. No.: WO00/05698

PCT Pub. Date: Feb. 3, 2000

(30) Foreign Application Priority Data

Jul. 22, 1998 (AT) .............................................. 1265/98

(51) Int. Cl.[7] .............................. G09F 1/00; A47G 1/06
(52) U.S. Cl. ................................ 40/124.06; 40/124.12; 40/654.01; 40/661.08; 40/789
(58) Field of Search ......................... 40/124.06, 124.12, 40/405, 611, 654.01, 661.08, 765, 775, 776, 789; 150/145, 147, 149

(56) References Cited

U.S. PATENT DOCUMENTS

| 944,385 | A | * | 12/1909 | Spiegel | ........................ 40/445 |
| 1,683,996 | A | * | 9/1928 | Snow | ........................ 150/147 |
| 2,737,991 | A | * | 3/1956 | Bass | ...................... 150/147 X |
| 3,537,728 | A | * | 11/1970 | Reese | ...................... 150/147 X |
| 3,655,119 | A | * | 4/1972 | Thompson | .............. 150/147 X |

FOREIGN PATENT DOCUMENTS

| DE | 1522820 | * 10/1969 | ................. 150/147 |
| GB | 2262475 | 6/1993 | |
| GB | 2263885 | 8/1993 | |
| GB | 2317588 | 4/1998 | |
| WO | WO 94/25286 | 11/1994 | |
| WO | WO 96/28307 | 9/1996 | |
| WO | WO 98/25255 | 6/1998 | |

* cited by examiner

Primary Examiner—Brian K. Green
(74) Attorney, Agent, or Firm—Karl Hormann

(57) ABSTRACT

A device for displaying information or advertisements consisting of first and second substantially rectangular webs in superposition and connected by a fold line as well as, at least two adjacent margins by an adhesive tongue to form a pouch for retaining a flat body, and of a third rectangular web connected to one of the first and second webs along a margin thereof by a spine so that it may be folded over the pouch, the third web being connected on its surface with a fourth web consisting of a plurality of sections which may be folded into superposition and be retained between the pouch and the third web.

7 Claims, 2 Drawing Sheets

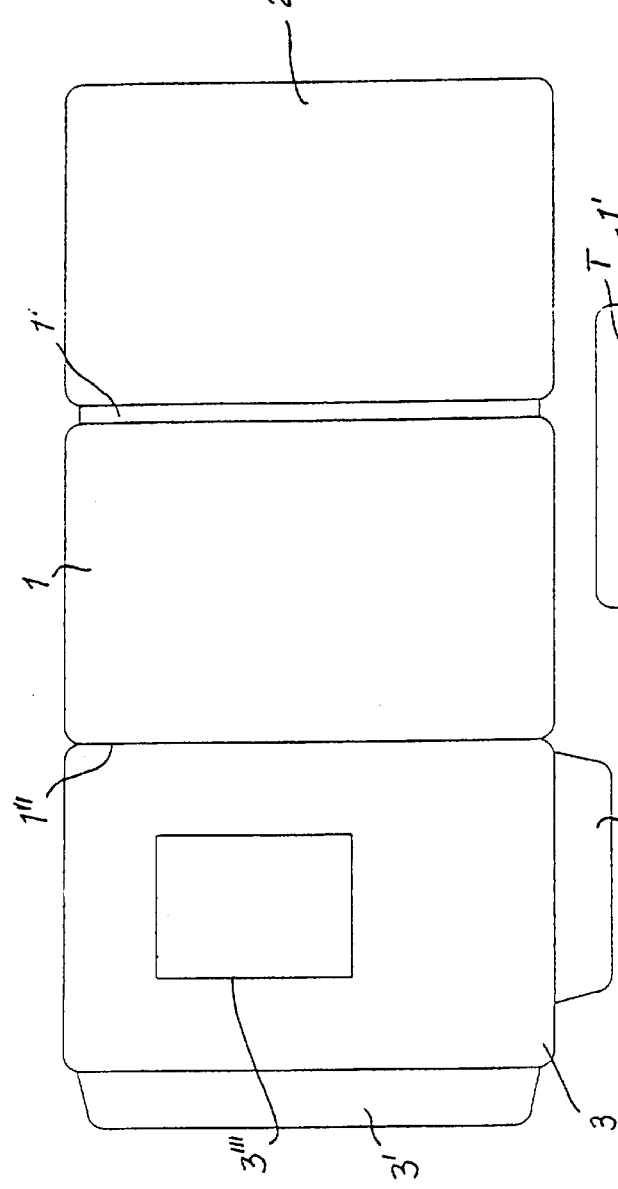
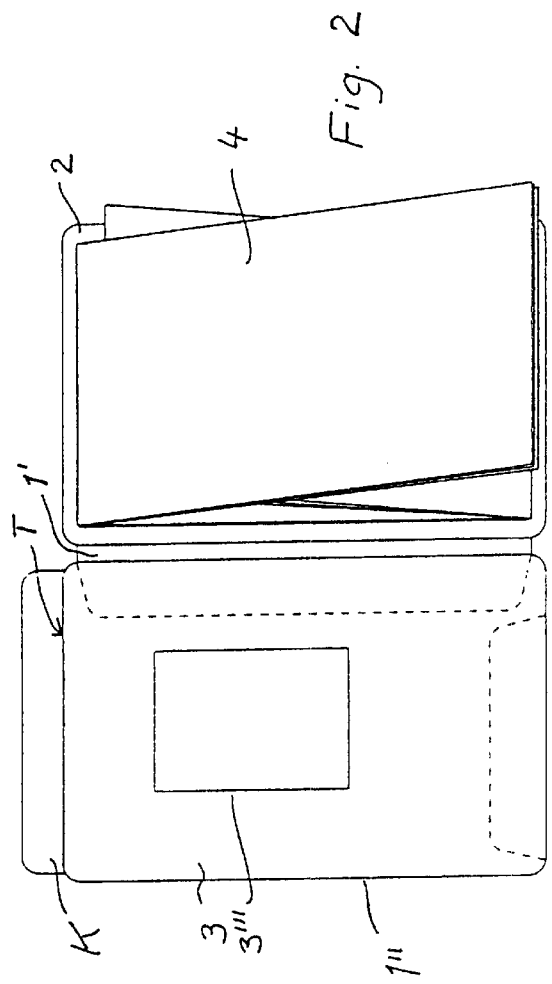

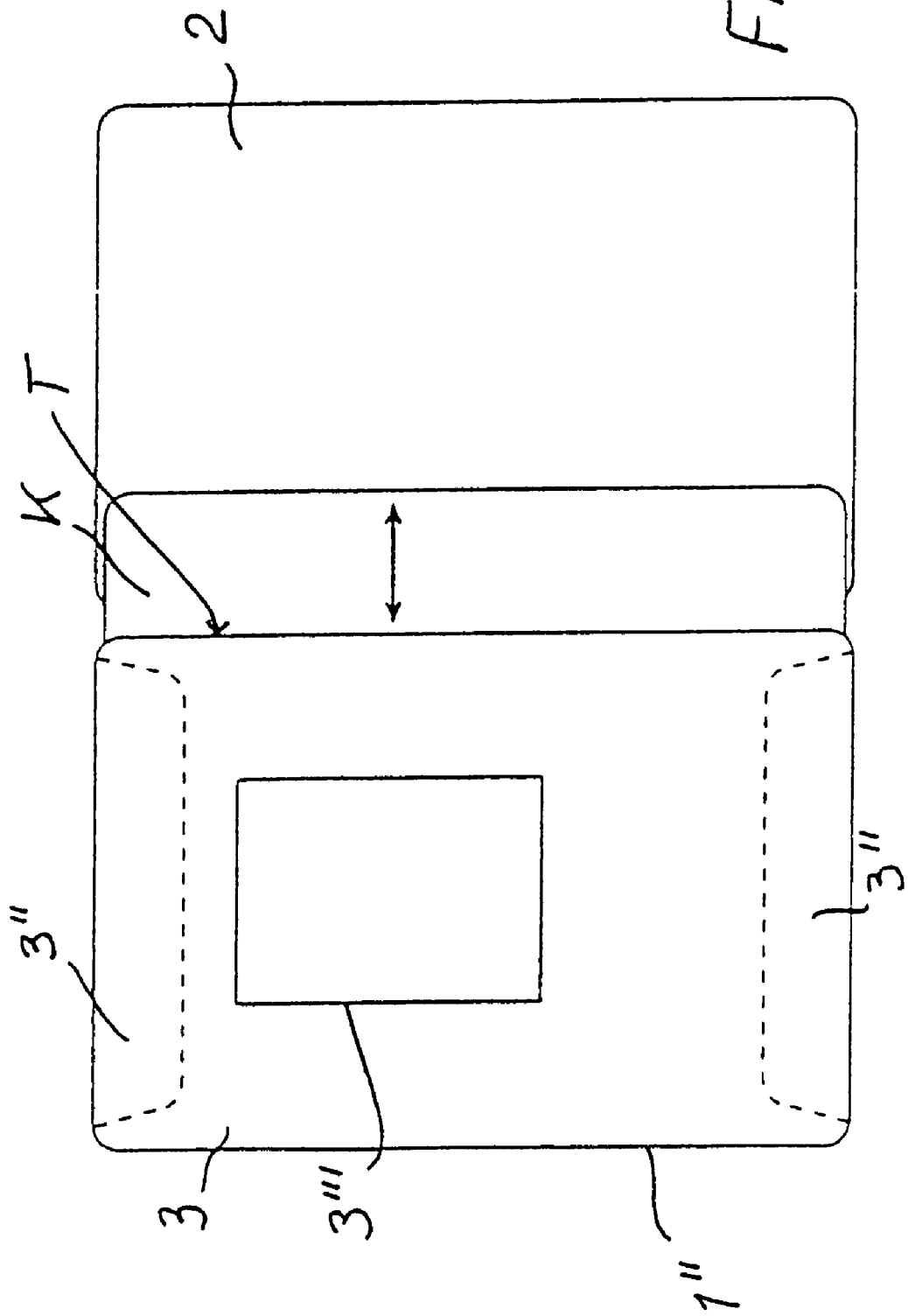

DEVICE FOR DISPLAYING INFORMATION OR ADVERTISING

BACKGROUND OF THE INVENTION

1. Field of the Invention

The invention relates to a device for displaying information or advertising having a foldable sheet made of paper, plastic or the like, which in its folded state is of a substantially rectangular format in the ISO card norm and which on the front and rear page of the folded package is provided with cover sheets made of card board, plastic or the like which compared to the folded sheet are stiffer, whereby the folded sheet is attached to the inner surface of one of the cover sheets whereas the other cover sheet is integrally connected to a further sheet which, with the cover sheet, forms a pouch for receiving a card, particularly a credit card or the like, whereby a slot for inserting the card is provided at least one lateral margin of the pouch.

2. The Prior Art

Such devices are known in different embodiments such as catalogs, information sheets, prospectuses, maps and the like, which because of their small format may be kept in wallets and the like. In one of the known embodiments (e.g. EP 0 288 472) cover sheets made of card board are arranged at the diagonally opposite corners of the unfolded folding sheet. By grasping the two cover sheets with the folded sheet disposed therebetween, the folded device may by a single movement be unfolded in the manner of a concertina. Since the creases between the sheets are formed permanently, the sheet may be easily folded again after use. The essential drawback of this construction is that the cover sheets move relative to each other during insertion of the device into the narrow card slot of wallets and the like which damages the creases of the folding sheet and prevents precise unfolding and folding of the device.

OBJECT OF THE INVENTION

Preferably, the internal sheet is provided with an adhesive tongue at a long margin and at least one narrow margin.

In accordance with a further embodiment of the invention the internal sheet is provided with a display window.

As a result of the construction in accordance with the invention, the long folding spine forms a strong leading edge when inserting the device into narrow slots of wallets, bill folds and the like, and thus prevents shifting of the inner folding sheet and in this manner protects the creases thereof. Furthermore, the adhesive construction of the pouch ensure a secure storage of a credit card or the like.

DESCRIPTION OF THE SEVERAL DRAWINGS

The invention will hereafter be described in greater detail on the basis of embodiments with reference to the drawings, in which:

FIG. 1 is a top elevational view of an unfolded device prior to adhesively mounting the internal sheet and the folding sheet;

FIG. 2 is a view of the opened device according to FIG. 1; and

FIG. 3 is alternative embodiment of the invention.

DETAILED DESCRIPTION OF PREFERRED EMBODIMENTS

In accordance with FIG. 1 the depicted device 3 is provided with three integrally formed rectangular cover sheets 1, 2, 3 made of card board, plastic or the like, connected to each other by folding creases, the cover sheets 1, 2 being connected to each other along one of their margins by means of a folding spine 1', as compared to the cover sheet 3 being connected to the cover sheet 1 at a long margin by means of a folding crease 1" and being inwardly foldable over it. The cover sheet 3 is adhesively connected to the cover sheet 1 by an adhesive tongue 3' and an adhesive tongue 3" at a long margin and at a short margin thus forming a secure pouch T for insertion of a credit card K or the like made of a relatively stiff material such as plastic. The cover sheet 3 is provided with a window 3''' through which the card K is visible.

A folding sheet 4 made of paper or plastic and consisting of a predetermined number of rows and columns formed by permanent creases and which may be folded together substantially in the manner of a concertina, is adhesively connected to the internal surface of the cover sheet 2 so that the folded package fits between the relatively stiffer cover sheets 1, 2.

In accordance with FIG. 3, the cover sheet 2 may be connected to the cover sheet 1 by two adhesive tongues 3" at the short margins, whereby the card K is inserted into the pouch T from the inside of the device.

It will be understood that in the context of the invention the described embodiments may be changed in different ways. For instance, another kind of connection, such as an interlocking or frictional one, may be provided between the one cover sheet and the internal sheet.

What is claimed is:

1. A device for displaying information or advertisements, comprising:

first and second substantially rectangular webs of substantially identical shape and size connected by a fold line;

a third substantially rectangular web of substantially the same shape and size as the first and second webs and connected to a first margin of one of the first and second webs by a spine;

a fourth web comprising a plurality of sections foldable in superposition and being connected by one of the sections to the surface of the third web;

a tongue extending from a second margin of at least one of the first and second webs for adhesive attachment to an opposite margin of the other of the first and second webs thereby to form a pouch between the first and second webs.

2. The device of claim 1, further comprising a second tongue extending from a third margin of one of the first and second webs for adhesive attachment to an opposite margin of the other of the first and second webs thereby to form a pouch between the first and second webs.

3. The device of claim 2, wherein at least one of the first and second webs is provided with an opening for forming a display window.

4. The device of claim 3, wherein each section of the fourth web is of substantially equal shape and size.

5. The device of claim 4, wherein each section of the fourth web is of rectangular shape.

6. The device of claim 5, wherein the shape and size of the sections are less than the shape and size of the third web.

7. The device of claim 1, wherein the sections of the fourth web are folded in concertina fashion.

* * * * *